(12) United States Patent
Moonen

(10) Patent No.: US 7,953,120 B2
(45) Date of Patent: May 31, 2011

(54) EFFICIENT SYNCHRONIZATION OF A SLIDING BUFFER WINDOW TO PREVENT PACKET RE-INJECTION IN AN INTERNET PROTOCOL (IP) NETWORK

(75) Inventor: Scott C. Moonen, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 12/059,452

(22) Filed: Mar. 31, 2008

(65) Prior Publication Data

US 2009/0245290 A1 Oct. 1, 2009

(51) Int. Cl.
*H04J 3/06* (2006.01)
*G01R 31/08* (2006.01)
(52) U.S. Cl. ........................................ 370/503; 370/235
(58) Field of Classification Search .................. 370/503, 370/235
See application file for complete search history.

(56) References Cited

U.S. PATENT DOCUMENTS

| | | | |
|---|---|---|---|
| 6,128,710 A | 10/2000 | Greenspan et al. | |
| 2004/0008711 A1* | 1/2004 | Lahti et al. | 370/428 |
| 2004/0202110 A1* | 10/2004 | Kim | 370/235 |
| 2008/0288872 A1* | 11/2008 | Burkley et al. | 715/723 |
| 2009/0158417 A1* | 6/2009 | Khanna et al. | 726/12 |

* cited by examiner

*Primary Examiner* — Derrick W Ferris
*Assistant Examiner* — Angel Brockman
(74) *Attorney, Agent, or Firm* — Jeffrey T. Holman

(57) ABSTRACT

An apparatus, system, and method are disclosed for efficient synchronization of a sliding buffer window to prevent packet re-injection in an IP network. The steps of the method include receiving a data packet which comprises a packet sequence number. The method initializes a replay counter, an update counter, and a circular buffer window. The circular buffer window may comprise at least one window bank and the circular buffer window may also comprise a current window bank. Furthermore, the method may include determining that the packet sequence number is greater than a maximum current bank value. In response, the method may define shifting the circular buffer window such that a current window bank position is incremented. The method may then include determining that the packet sequence number is inside the current window bank and accepting the data packet. Furthermore, a Double Compare and Swap (DCS) operation may update the bit indicator and increment the update counter and replay counter. Also, a Compare and Swap and Store (CSST) operation may increment the update counter and replay counter and set a shifted window bank. Therefore, DCS and CSST operation may still be used without having to resort to traditional locks with higher overhead. In addition, the buffer window may be an arbitrary size and is not limited to the machine architecture limit for compare and swap operations.

20 Claims, 5 Drawing Sheets

EFFICIENT SYNCHRONIZATION OF A SLIDING BUFFER WINDOW TO PREVENT PACKET RE-INJECTION IN AN INTERNET PROTOCOL (IP) NETWORK

BACKGROUND OF THE INVENTION

1. Field of the Invention

This invention relates to Internet Protocol (IP) security and more particularly relates efficient synchronization of a sliding buffer window to prevent packet re-injection in an IP network.

2. Description of the Related Art

IP security (IPsec) protocols such as Authentication Header (AH) and Encapsulating Security Payload (ESP) usually provide protection against packet replay attacks. A packet replay attack occurs in situations when an attacker with access to encrypted packets saves those packets and re-injects them into the network at a later time. This type of attack may cause a denial of service which forces the packet receiver to waste cycles decrypting valid packets. In addition, the receiver is often also forced to replay previous actions if the underlying protocol carried in the replay packet is a connectionless protocol such as User Datagram Protocol (UDP).

Replay protection is accomplished by including a monotonically increasing sequence number in each packet sent and checking the sequence number of each received packet against a record of recently received sequence numbers. Normally the receiver accomplishes this by keeping two variables: a record of the highest sequence number received to date, and a sliding window bitmap (often 32 bits) indicating whether each of the 32 prior sequence numbers has been seen. Since the bitmap is limited in size, any packet with a sequence number more than 32 values older than the highest value seen so far is automatically discarded since it cannot be verified whether it is a duplicate.

There are two difficulties involved in the use of replay windows. The first difficulty concerns synchronization in a multi-processing environment. If multiple inbound packets may be processed simultaneously by a receiver, some mechanism is required to ensure that the highest-seen sequence number and the window bitmap are updated synchronously. Known techniques for doing this include the use of a lock, which has a performance disadvantage, and compare-and-swap operations covering both the sequence number and the bitmap, which have the disadvantage of limiting the window bitmap to the size of the largest compare and swap operation supported on a given architecture.

The second difficulty concerns the problem of out-of-order packets, which may occur in environments with high latency (packets get reordered in the network) or where multiple connections are flowing through the same IPsec security association (introducing race conditions in both the sending and receiving systems as packets are processed). If packets arrive at the receiver out of order by more positions than the size of the replay window, then they will be immediately discarded as described earlier, since their sequence numbers have passed beyond the edge of the window and cannot be verified. The solution to this second difficulty is to define a larger replay bitmap, but this may exceed the compare-and-swap capabilities of a given architecture, forcing the implementation to use much slower forms of synchronization such as latches or spin-locks.

SUMMARY OF THE INVENTION

The present invention has been developed to provide an apparatus, system, and method for efficient synchronization of a sliding buffer window to prevent packet re-injection in an Internet Protocol (IP) network.

A method is presented for receiving a data packet, initializing a replay counter, an update counter, and a circular buffer window, and determining that the packet sequence number is greater than a maximum current bank value. The method may also include shifting the circular buffer window, determining that the data packet is inside the current window bank, and accepting the data packet.

In one embodiment, the method includes the step of receiving a data packet which comprises a packet sequence number. The method initializes a replay counter, an update counter, and a circular buffer window. The circular buffer window may comprise at least one window bank and a current window bank. Furthermore, the method may include determining that the packet sequence number is greater than a maximum current bank value. In response, the method may shift the circular buffer window such that a current window bank position is incremented. The method may then determine that the packet sequence number is inside the current window bank and accept the data packet.

In another embodiment, the method defines updating a bit indicator in the circular buffer window and incrementing the update counter and replay counter. The method also accepts the data packet after determining both that the packet sequence number is not greater than a maximum current bank value and that the data packet has not been accepted. In this embodiment, updating the bit indicator and incrementing the update counter and replay counter may be performed by a Double Compare and Swap (DCS) operation.

In one embodiment, incrementing the update counter and replay counter and setting a shifted window bank is performed by a Compare and Swap and Store (CSST) operation. Furthermore, the data packet may be discarded if it is beyond a buffer window capacity. The data packet may also be discarded if it has already been placed in the circular buffer window. In some embodiments, the circular buffer window is a bitmap.

An apparatus for efficient synchronization of a sliding buffer window to prevent packet re-injection in an IP network is provided with a plurality of modules configured to functionally perform the necessary steps as described in the method above. These modules in the described embodiments include a receiving module, an initialization module, a sequence determination module, a shifting module, a determination module, and an accepting module.

A system of the present invention is also presented to implement the above mentioned method for efficient synchronization of a sliding buffer window to prevent packet re-injection in an IP network. The system may be embodied as a network configured to communicate data between a plurality of devices, one or more data packet sending devices in communication with the network, and a packet receiving device in communication with the network.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
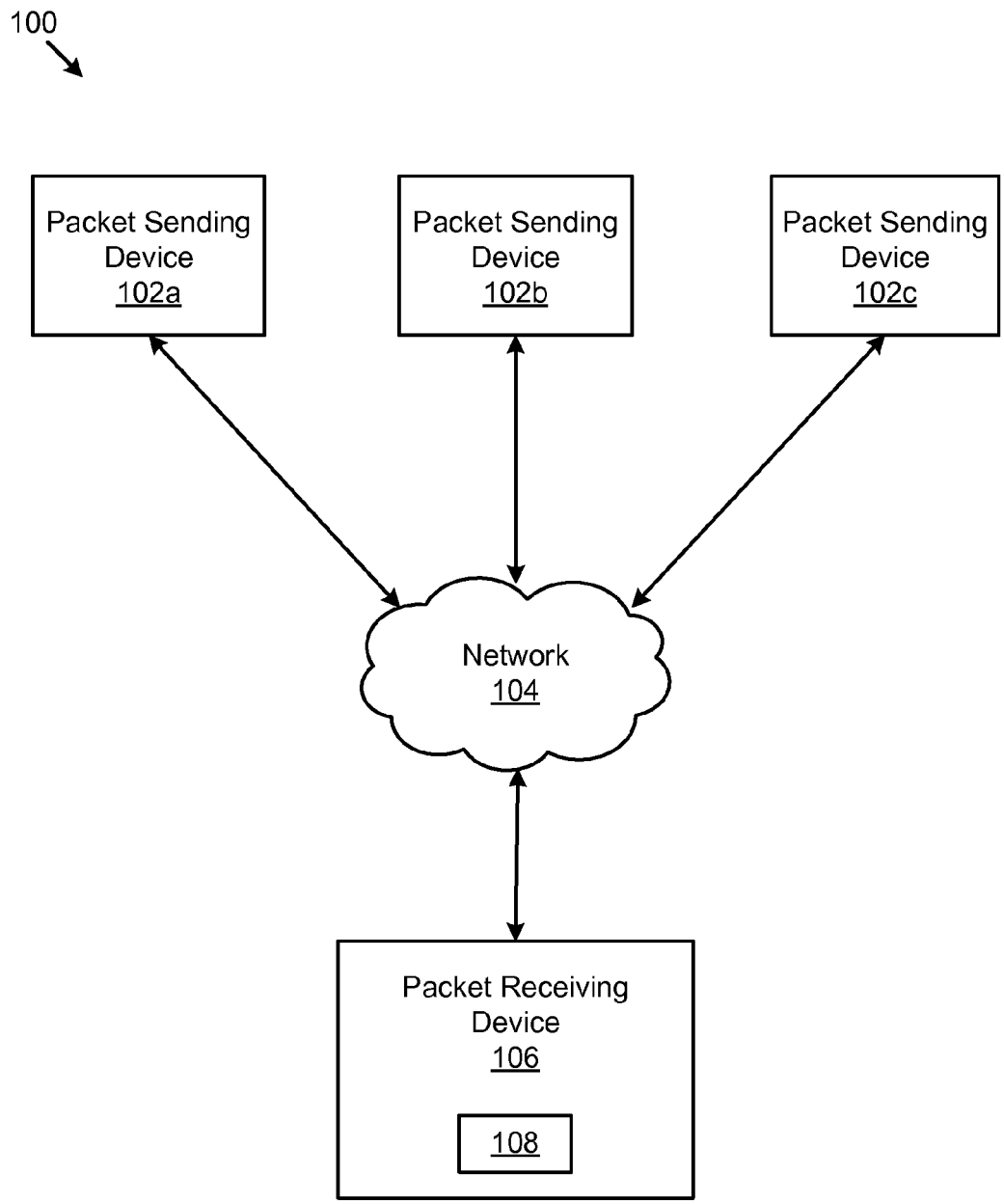
FIG. 1 is a schematic block diagram illustrating one embodiment of a system for efficient synchronization of a sliding buffer window to prevent packet re-injection in an IP network.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for efficient synchronization of a sliding buffer window to prevent packet re-injection in an IP network. The system 100 includes one or more packet sending devices 102a-c in communication with a network 104. Furthermore, a packet receiving device 106 with a buffer window synchronizer 108 is also in communication with the network 104. Those of skill in the art recognize that the system 100 may be simpler or more complex than illustrated, so long as the system 100 includes modules or sub-systems that correspond to those described herein.

The one or more packet sending devices 102a-c may include but not be limited to computer systems including servers and personal computers, portable devices including cell phones and Personal Digital Assistants (PDAs), and any other device configured to send information across a network 104 using an IP protocol. The network 104, in turn, may comprise LANs, WANs, SNA networks, Internet and the like and is used for data and message transmission.

The packet receiving device 106 may also comprise a computer system including a server and personal computer, a portable device including a cell phone and PDA, and any other device configured to receive information from a network 104 using an IP protocol. Furthermore, the machine architecture of the packet receiving device 106 may support a Compare and Swap (DCS) operation on disjoint data and a Compare and Swap and Store (CSST) operation on disjoint data, as described in U.S. Pat. No. 6,128,710 entitled "Method Utilizing a Set of Blocking-Symbol Resource-Manipulation Instructions for Protecting the Integrity of Data in Noncontiguous Data Objects of Resources in a Shared Memory of a Multiple Processor Computer System," which is incorporated herein by reference for all purposes. In addition, the packet receiving device comprises a buffer window synchronizer 108.

Figure 2:
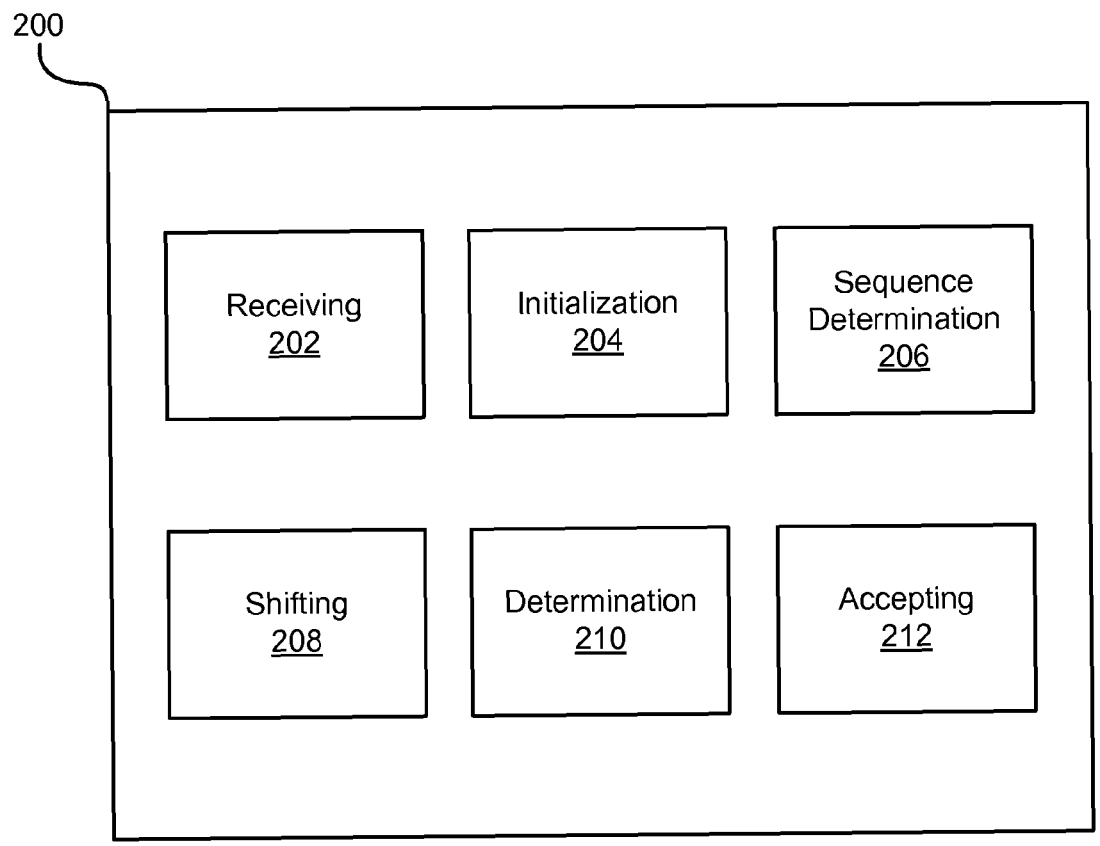
FIG. 2 is a schematic block diagram illustrating one embodiment of an apparatus for efficient synchronization of a sliding buffer window to prevent packet re-injection in an IP network.

FIG. 2 illustrates one embodiment of an apparatus 200 for efficient synchronization of a sliding buffer window to prevent packet re-injection in an IP network. The apparatus 200 depicts one embodiment of a buffer window synchronizer 108 located on the packet receiving device and includes a receiving module 202, an initialization module 204, a sequence determination module 206, a shifting module 208, a determination module 210, and an accepting module 212. In one embodiment, the receiving module 202 receives a data packet which contains a packet sequence number.

The initialization module 204, in one embodiment, initializes a replay counter (r_cnt), an update counter (r_update), and a circular buffer window. The circular buffer window may be a bitmap and may comprise at least one window bank. A window bank may be a collection of contiguous bits in storage representing the maximum size that the machine architecture of the packet receiving device allows for DCS and CSST operations. For example, a bitmap window may be 2048 bytes in size divided into 16 banks, each 128 bits in size. In this example, while 128 bits may be fixed as a supported size of the DCS and CSST operations on the hardware, the 2048 byte window may be larger or smaller, as long as the window is a multiple of the bank size.

In addition, the circular buffer window comprises a current window bank. The current window bank may be determined by r_cnt divided by the bank size, modulo the number of banks (i.e. (r_cnt/128) modulo 16). The modulo operation allows the buffer U window to be circular, as the current bank will always be selected from banks 1-16. Therefore, although the buffer window size is not limited to the machine architecture limit of the compare and swap operations, the apparatus does not need to use slower forms of synchronization such as latches or spin-locks. The buffer window may be of an arbitrary size while maintaining banks small enough to accommodate DCS and CSST operations. A large buffer window can accommodate a larger number of packets being processed significantly out of order.

The buffer window, r_cnt, and r_update may be initialized to zero when an IPsec security association is created. For storage and synchronous update purposes, the r_cnt and r_update variables may be maintained as a single entity in one block of storage. Also, the initialization module 204 may also initialize other variables to track the incrementing of r_cnt, r_update, and the buffer window.

The sequence determination module 206, in one embodiment, determines that the packet sequence number is greater than a maximum current bank value. In this scenario, the bank requires shifting because the packet sequence number is not among any values available in the current bank.

In some embodiments, the shifting module 208 shifts the circular buffer window to increment the current window bank position. This shifting may occur when, as described above, the packet sequence number is greater than the maximum current bank value. When shifted, the current window bank is incremented by one bank. Therefore, if the window bank size is 128 bits, the window bank will be shifted by 128 bits. Furthermore, because r_cnt is initialized to zero and is shifted only in increments of the bank size, r_cnt will always be a multiple of the bank size. In the 128-bit bank size example, Bit 0 of the current bank represents the sequence number equal to r_cnt, bit 1 represents the sequence number equal to r_cnt−1, and so forth. Likewise, the preceding bank ((r_cnt/128)−1) modulo 16) represents sequence numbers r_cnt−128 through r_cnt−255, and so forth for all other banks.

CSST may be used to synchronously advance the replay counter, increment the update counter, and set the newly shifted window bank ((r_cnt/128) modulo 16) to zeroes. Even though the buffer window size may be larger than the size supported by the machine architecture, CSST may still be used instead of conventional locking. As previously mentioned, the CSST operation avoids significant performance overhead issues of latches or locks.

If the machine architecture of the packet receiving device 106 supports Compare and Swap and Double Store (CSDST)

or Compare and Swap and Triple Store (CSTST), then these instructions may be used when necessary to shift the buffer window by 256 and 384 bits, respectively. If a large window shift becomes necessary (e.g., one million sequence numbers are skipped due to a significant number of packets being lost), then it is computationally expensive to iteratively shift the window by 128 or even 384 bits at a time. In this case using the 128-bit example, r_cnt may be updated in a single operation and CSTST may be used to zero out only three of the sixteen 128-bit banks in the window. The remaining thirteen banks will contain residual bits and this may result in the discarding of several packets. However, while highly unlikely, this may cause unnecessary packet loss for some packets that are out of order by more than 384 positions.

In one embodiment, the determination module 210 determines that the packet sequence number is inside the current window bank. Finally, in another embodiment, the accepting module 212 accepts the data packet in response to determining that the packet sequence number is inside the current window bank.

Figure 3:
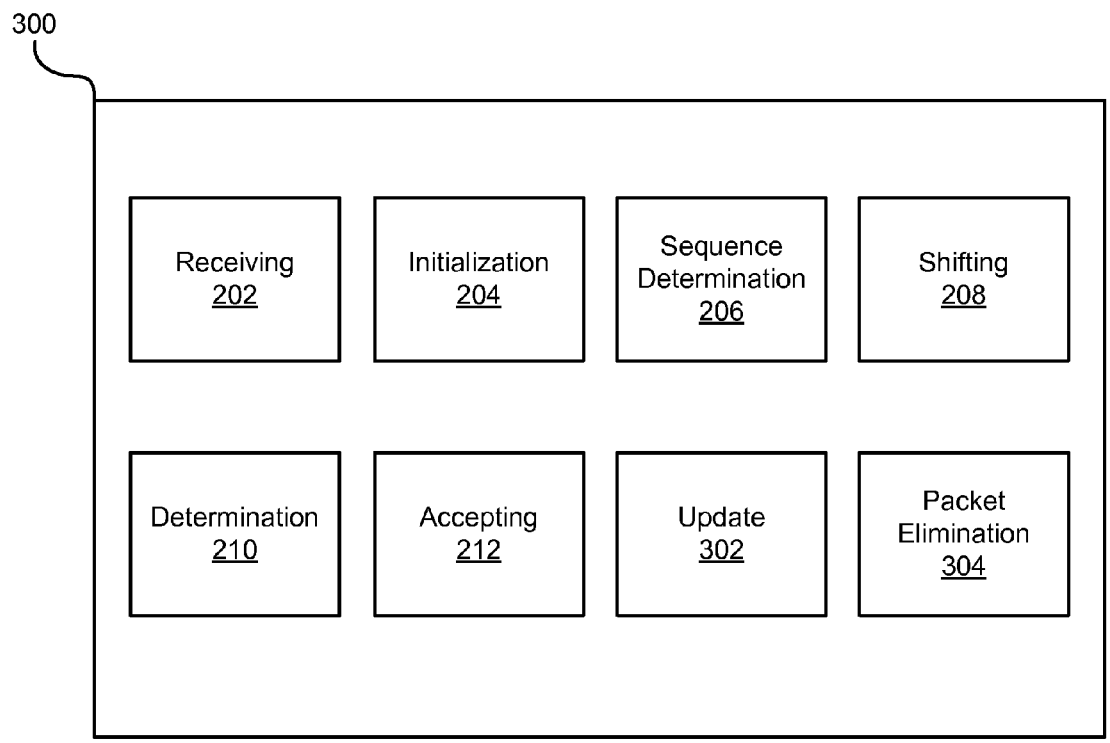
FIG. 3 is a detailed schematic flow chart diagram illustrating one embodiment of an apparatus for efficient synchronization of a sliding buffer window to prevent packet re-injection in an IP network.

FIG. 3 illustrates another embodiment of an apparatus 300 for efficient synchronization of a sliding buffer window to prevent packet re-injection in an IP network. The apparatus 300 includes the receiving module 202, an initialization module 204, a sequence determination module 206, a shifting module 208, a determination module 210, and an accepting module 212, wherein these modules include substantially the same features as described above with relation to FIG. 2.

Additionally, the apparatus 300 may further comprise an update module 302. In one embodiment, the update module 302 updates a bit indicator in the circular buffer window and increments r_update and r_cnt if the buffer window does not need shifting and if the data packet has not already been accepted. The bit indicator in the buffer window is updated to indicate that the data packet has been accepted, and the accept module accepts the data packet. Updating the bit indicator and incrementing r_update and r_cnt may be performed by a DCS operation, which synchronously activates the bit and increments the counters.

The apparatus may also comprise a packet elimination module 304. In some embodiments, the packet elimination module 304 discards the packet if the data packet sequence number is greater than the maximum buffer window capacity. In the 128-bit example, if any packet is received with a sequence number more than 2048 values older than r_cnt, a replay attack cannot be determined and the packet is discarded. Furthermore, the packet elimination module 304 may also discard the data packet if the packet has already been placed in the buffer window.

Figure 4:
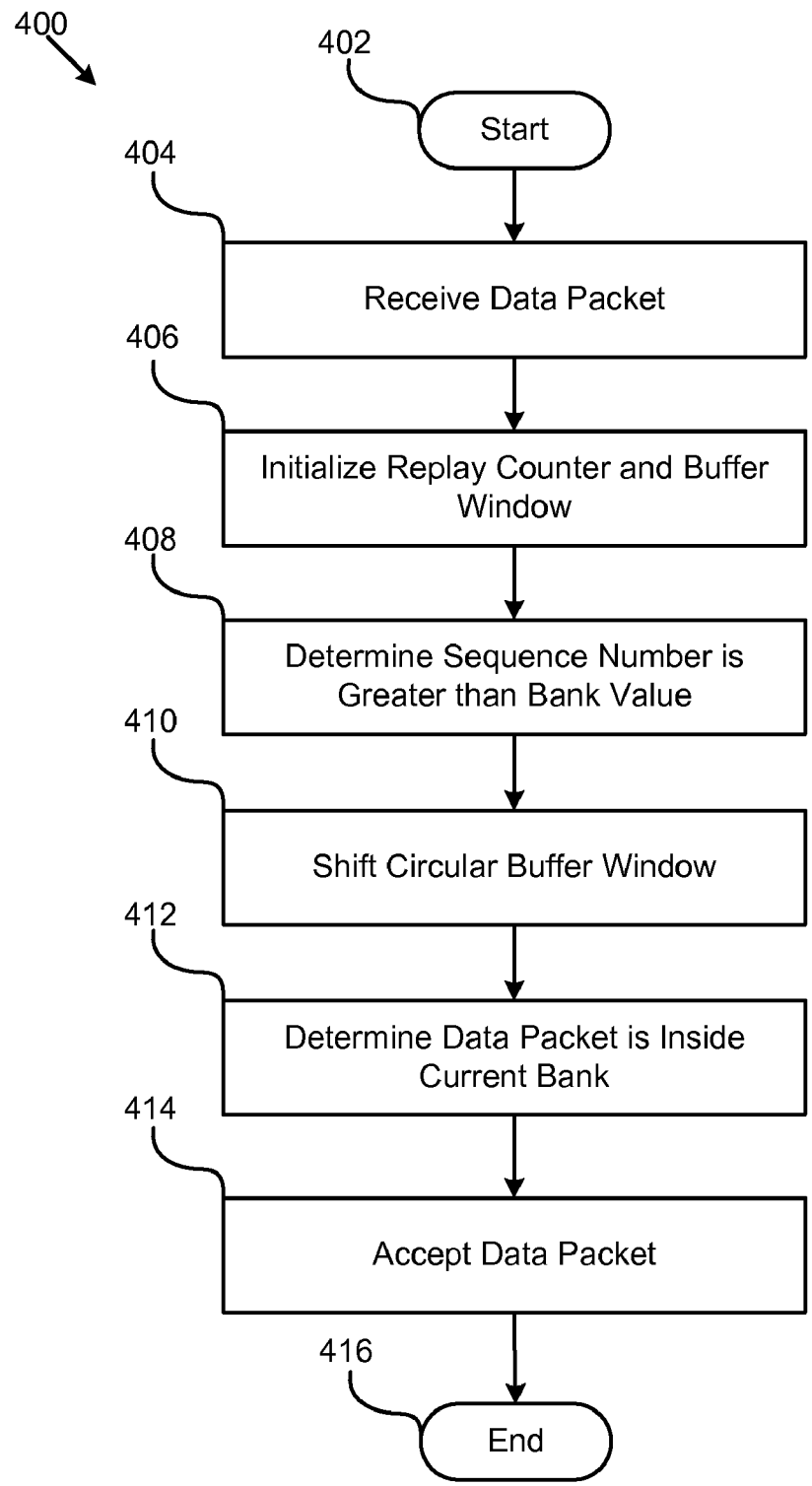
FIG. 4 is a schematic flow chart diagram illustrating one embodiment of a method for efficient synchronization of a sliding buffer window to prevent packet re-injection in an IP network.

FIG. 4 illustrates one embodiment of a method 400 for efficient synchronization of a sliding buffer window to prevent packet re-injection in an IP network. The method 400 starts 402 when the receiving module 202 receives 404 a data packet. The initialization module 204 then initializes 406 a replay counter, an update counter, and a circular buffer window. Next, the sequence determination module 206 determines 408 that the packet sequence number is greater than a maximum current bank value, and hence, that the window requires shifting. In response, the shifting module 208 shifts 410 the circular buffer window and increments the current window bank position to the next bank in sequence. The determination module 210 determines 412 that the packet sequence number falls within the current window bank. As a result, the accepting module 212 accepts 414 the data packet and the method 400 ends 416.

Figure 5:
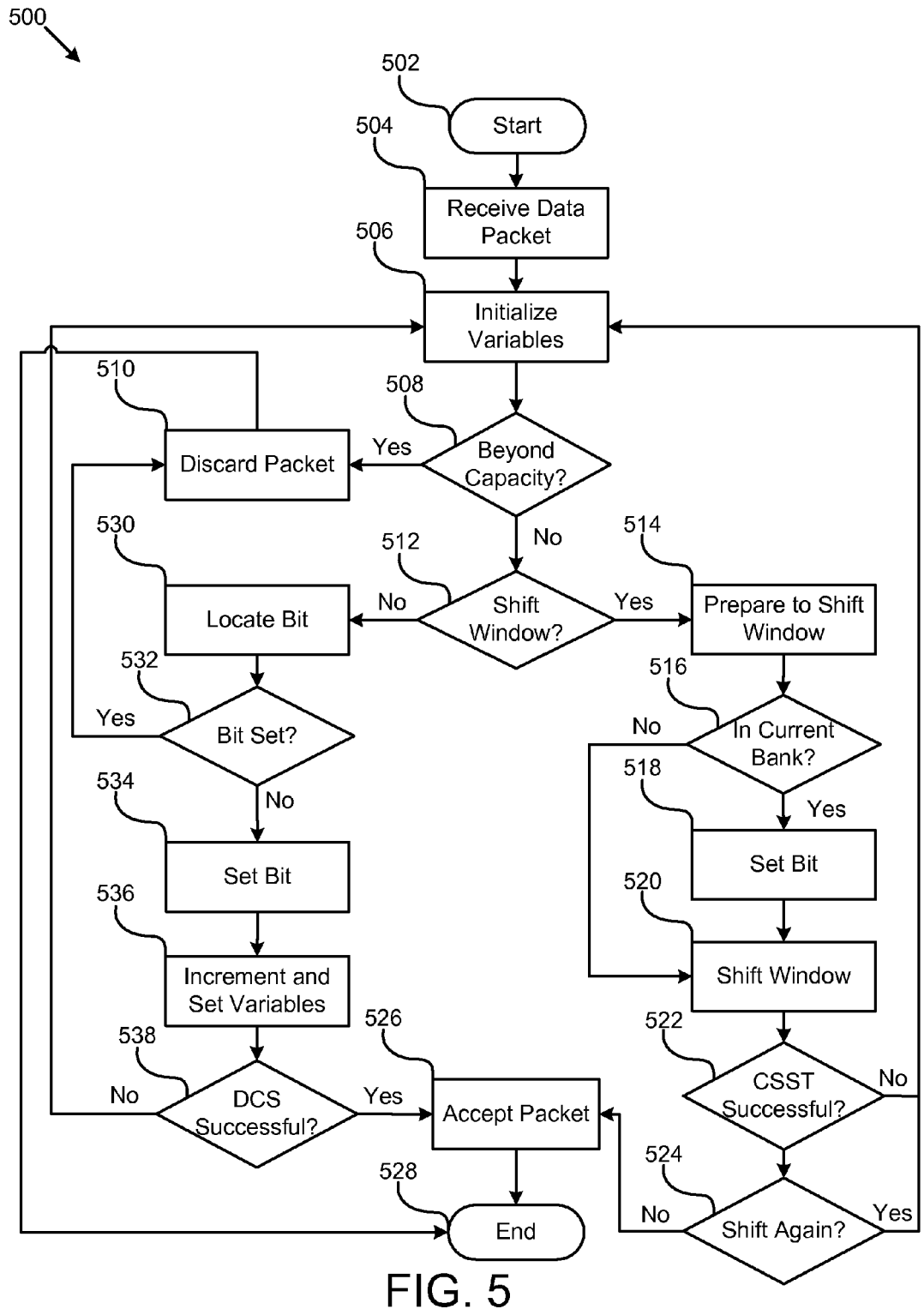
FIG. 5 is a detailed schematic flow chart diagram illustrating one embodiment of a method for efficient synchronization of a sliding buffer window to prevent packet re-injection in an IP network.

FIG. 5 illustrates a detailed embodiment of a method 500 for efficient synchronization of a sliding buffer window to prevent packet re-injection in an IP network. The window bank size in the pseudocode examples in this embodiment is 128 bits with 16 total banks. The method 500 starts 502 when the receiving module 202 receives 504 a data packet. The initialization module 204 then initializes 406 the necessary variables:

| | | | |
|---|---|---|---|
| new_cnt | := | cur_cnt | := r_cnt |
| cur_update | := | r_update | |
| new_update | := | cur_update + 1 | |
| new_window | | := cur_window | := r_window | new_cnt, cur_cnt, and r_cnt are instances of the replay counter;

cur_update, new_update, and r_update are instances of the update counter;

new_window, cur_window, and r_window are instances of the buffer window;

Next, the packet elimination module 304 determines 508 whether the packet sequence number is beyond the buffer window capacity:

if (new_cnt−p_seq>=2048), then the packet is beyond capacity;

If the packet elimination module 304 determines 508 that the packet is beyond the capacity of the window, the packet elimination module 304 discards 510 the packet and the method 500 ends 528.

Conversely, if the packet is not beyond the capacity of the window, the sequence determination module 206 determines 512 whether the buffer window requires shifting:

if (p_seq>new_cnt), then window requires shifting;

If the sequence determination module 304 determines 512 that the window requires shifting, the shifting module 208 prepares 514 to shift the circular buffer window by one bank by updating the variables and creating a new window bank:

| | | | |
|---|---|---|---|
| new_cnt | := | cur_cnt | + 128 |
| diff | := | new_cnt − p_seq | |
| bit_bank | := | (new_cnt / 128) MOD 16 | |
| new_window | | (bit_bank) | := 0 |

Next, the determination module 210 determines 516 whether the packet sequence number is inside the current window bank:

if (diff>=0), then the packet sequence number is inside the current window bank;

If the determination module 210 determines 516 that the packet sequence number is inside the current window bank, the bit corresponding to the packet number is set:

new_window[bit_bank][diff]:=1

If however, the packet sequence number is determined 516 to be outside the current window bank, the bit is not set. The shifting module 302 then shifts the window to the next bank by incrementing 520 the update counter and replay counter and setting the shifted window bank to zeros using a CSST operation:

CSST(cur_cnt / new_cnt −> r_cnt,
    cur_update / new_update −> r_update
    new_window −> r_window)

Shifting is performed by a full bank size and the shifting operation clears the bits in the bank to 0, except for the newly set bit if the bit was inside the bank. Therefore, if the bit was not set, the entire bank would consist of zeros. Furthermore, the updated counter variables indicate that the bank has been shifted.

If the update module 302 determines 522 that the CSST operation was not successful, the process is repeated beginning with the initialization module 506 initializing 506 the required variables. Conversely, if the update module 302 determines 522 that the CSST operation was successful, the determination module 210 determines 524 whether the buffer window requires further shifting:

if (diff<0), then the buffer window requires further shifting;

If the window needs further shifting, the process is repeated beginning with the initialization module 204 initializing 506 the required variables.

However, if the determination module 210 determines 524 that the window does not need further shifting, the accepting module 212 accepts 526 the data packet and the method 500 ends 528. The receiving module 202 may then receive additional packets.

Returning now to the sequence determination module 206 determining 512 that the buffer window does not require shifting. The update module 302 locates 530 the bit corresponding to p_seq in the window bank:

| | | |
|---|---|---|
| bit_bank | := | (new_cnt / 128) MOD 16 |
| bit_num | := | (new_cnt − p_seq) MOD 128 |

Next, the sequence determination module 206 determines 532 if the bit is already set in the window bank:

if (new_window[bit_bank][bit_num]=1), then bit is already set;

The bit corresponds to the p_seq number in the bank and therefore, if the bit is already set, the packet has already been received. If the sequence determination module 206 determines 532 that the bit is already set, the packet elimination module 304 discards 510 the packet and the method 500 ends 528.

However, if the bit has not been set, the update module 302 sets 534 the bit:

new_window[bit_bank][bit_num]:=1;

Furthermore, the update module 302 then increments 536 the r_update and r_cnt and updates the r_window using a DCS operation:

| |
|---|
| DCS(cur_cnt / new_cnt −> r_cnt, |
| cur_update / new_update −> r_update |
| cur_window / new_window −> r_window) |

If the update module 302 determines 538 that the DCS operation was not successful, the process is repeated beginning with the initialization module 506 initializing 506 the required variables. Conversely, if the update module 302 determines 538 that the DCS operation was successful, the accepting module 212 accepts 526 the packet. Then, the method 500 ends 528.

The following method example does not require the buffer window to be shifted. The method 500 starts 502 when the receiving module 202 receives 504 a data packet with p_seq equal to 128. Assuming that r_update is equal to 125, r_cnt is equal to 128, and that the pertinent 32-bit portion of r_window equals . . . 7EF7FFFF . . . , the initialization module 204 initializes 406 new_cnt and cur_cnt both to 128, new_window and cur_window to . . . 7EF7FFFF . . . , cur update to 125, and new_update to 126. Next, the packet elimination module 304 determines 508 that 128−128 (i.e. new_cnt−p_seq) is not greater than or equal to 2048, the buffer window capacity. Next, the sequence determination module 206 determines 512 that 128, or p_seq, is not greater than 128, or new_cnt and that the window does not require shifting. The update module 302 locates 530 the bit corresponding to p_seq in the window bank by arriving at two bit location variables, bit bank: (128/128) MOD 16=0, and bit_num: (128−128) MOD 128=0. Assuming that the packet has not yet been received, the sequence determination module 206 determines 532 that the bit at new_window[0][0] equals 0 and is not set. The update module 302 sets 534 the bit at new_window[0][0] to 1.

Furthermore, the update module 302 then increments 536 r_update to 126, and sets r_window to . . . FEF7FFFF . . . with a DCS operation. The update module 302 determines 538 that the DCS operation was successful and the accepting module 212 accepts 526 the packet. Then, the method 500 ends 528.

The following method example requires the buffer window to be shifted. The method 500 starts 502 when the receiving module 202 receives 504 a data packet with p_seq equal to 129. Assuming that r_update is equal to 126, r_cnt is equal to 128, and that the pertinent 32-bit portion of r_window equals . . . 7EF7FFFF . . . , the initialization module 204 initializes 406 new_cnt and cur_cnt both to 128, new_window and cur_window to . . . 7EF7FFFF . . . , cur update to 126, and new_update to 127. Next, the packet elimination module 304 determines 508 that 128−128 (i.e. new_cnt−p_seq) is not greater than or equal to 2048, the buffer window capacity. The sequence determination module 206 determines 512 that 129, or p_seq, is greater than 128, or new_cnt and that the window requires shifting. The shifting module 208 prepares 514 to shift the circular buffer window by setting new_cnt equal to the sum of 128 and the value of cur_cnt: 128+128=256. Furthermore, the variable diff is computed: 256−129=127, and bit_bank, to be used as the next bank number is computed: (256/128) MOD 16=2. Finally, new_window corresponding to the bit bank variable is set to 0.

Next, the determination module 210 determines 516 that the packet sequence number is inside the current window bank: 127>=0. The bit corresponding to the packet number is set to 1: new_window[2][127]. The shifting module 302 then shifts the window to the next bank by incrementing 520 r_update to 127 adding 128 to r_cnt, and setting the shifted window bank to zeros using a CSST operation: . . . 00000001 . . . .

Assuming the CSST operation is successful, the determination module 210 determines 524 that the buffer window does not require further shifting: 127<0. Then, the accepting module 212 accepts 526 the data packet and the method 500 ends 528.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for efficient synchronization of a sliding buffer window to prevent packet re-injection in an Internet Protocol (IP) network, the method comprising:

receiving a data packet, the data packet comprising a packet sequence number;

initializing a replay counter, an update counter, and a circular buffer window, the circular buffer window comprising a plurality of window banks, each window bank comprising a plurality of bits, wherein one of the window banks is designated as a current window bank;

determining that the packet sequence number is greater than a maximum current bank value;

shifting the circular buffer window such that a current window bank position is incremented in response to determining that the packet sequence number is greater than the maximum current bank value;

determining that the packet sequence number is inside the current window bank; and accepting the data packet in response to determining that the packet sequence number is inside the current window bank.

2. The method of claim 1, further comprising updating a bit indicator in the circular buffer window, incrementing the update counter and replay counter, and accepting the data packet in response to determining that the packet sequence number is not greater than a maximum current bank value and determining that the data packet has not been accepted.

3. The method of claim 2, wherein updating the bit indicator and incrementing the update counter and replay counter is performed by a Double Compare and Swap ("DCS") operation.

4. The method of claim 1, wherein incrementing the update counter and replay counter and setting a shifted window bank is performed by a Compare and Swap and Store ("CSST") operation.

5. The method of claim 1, further comprising discarding the data packet in response to determining that the data packet is beyond a buffer window capacity.

6. The method of claim 1, further comprising discarding the data packet in response to determining that the data packet has already been placed in the circular buffer window.

7. The method of claim 1, wherein the circular buffer window is a bitmap.

8. An apparatus for efficient synchronization of a sliding buffer window to prevent packet re-injection in an Internet Protocol (IP) network, the apparatus comprising:
a receiving module configured to receive a data packet, the data packet comprising a packet sequence number;
an initialization module configured to initialize a replay counter, an update counter, and a circular buffer window, the circular buffer window comprising a plurality of window banks, each window bank comprising a plurality of bits, wherein one of the window banks is designated as a current window bank;
a sequence determination module configured to determine that the packet sequence number is greater than a maximum current bank value;
a shifting module configured to shift the circular buffer window such that a current window bank position is incremented 128 bits in response to determining that the packet sequence number is greater than the maximum current bank value;
a determination module configured to determine that the packet sequence number is inside the current window bank; and
an accepting module configured to accept the data packet in response to determining that the packet sequence number is inside the current window bank.

9. The apparatus of claim 8, further comprising an update module configured to update a bit indicator in the circular buffer window and increment the update counter and replay counter, and wherein the accepting module is further configured to accept the data packet in response to the sequence determination module determining that the packet sequence number is not greater than a maximum current bank value and determining that the data packet has not been accepted.

10. The apparatus of claim 9, wherein updating the bit indicator and incrementing the update counter and replay counter is performed by a Double Compare and Swap ("DCS") operation.

11. The apparatus of claim 8, wherein incrementing the update counter and replay counter and setting a shifted window bank is performed by a Compare and Swap and Store ("CSST") operation.

12. The apparatus of claim 8, further comprising a packet elimination module configured to discard the data packet in response to determining that the data packet is beyond a buffer window capacity.

13. The apparatus of claim 8, wherein the packet elimination module is further configured to discard the data packet in response to determining that the data packet has already been placed in the circular buffer window.

14. The apparatus of claim 8, wherein the circular buffer window is a bitmap.

15. A computer program product device for efficient synchronization of a sliding buffer window to prevent packet re-injection in an Internet Protocol (IP) network, the computer program product device comprising:
a computer-readable storage medium having computer program code stored thereon which, upon execution by a processor, causes the processor to implement:
a receiving module configured to receive a data packet, the data packet comprising a packet sequence number;
an initialization module configured to initialize a replay counter, an update counter, and a circular buffer window, the circular buffer window comprising a plurality of window banks, each window bank comprising a plurality of bits, wherein one of the window banks is designated as a current window bank;
a sequence determination module configured to determine that the packet sequence number is greater than a maximum current bank value;
a shifting module configured to shift the circular buffer window such that a current window bank position is incremented 128 bits in response to determining that the packet sequence number is greater than the maximum current bank value;
a determination module configured to determine that the packet sequence number is inside the current window bank; and an accepting module configured to accept the data packet in response to determining that the packet sequence number is inside the current window bank.

16. The computer program product device of claim 15, wherein the computer-readable storage medium comprises further computer program code which, upon execution by the processor, causes the processor to further implement an update module configured to update a bit indicator in the circular buffer window and increment the update counter and replay counter, and wherein the accepting module is further configured to accept the data packet in response to the sequence determination module determining that the packet sequence number is not greater than a maximum current bank value and determining that the data packet has not been accepted.

17. The computer program product device of claim 16, wherein updating the bit indicator and incrementing the update counter and replay counter is performed by a Double Compare and Swap ("DCS") operation.

18. The computer program product device of claim 15, wherein incrementing the update counter and replay counter and setting a shifted window bank is performed by a Compare and Swap and Store ("CSST") operation.

19. The computer program product device of claim 15, wherein the computer-readable storage medium comprises further computer program code which, upon execution by the processor, causes the processor to further implement a packet elimination module configured to discard the data packet in response to determining that the data packet is beyond a buffer window capacity.

20. The computer program product device of claim 15, wherein the packet elimination module is further configured to discard the data packet in response to determining that the data packet has already been placed in the circular buffer window.

\* \* \* \* \*